United States Patent
Chen et al.

(10) Patent No.: US 7,957,750 B2
(45) Date of Patent: Jun. 7, 2011

(54) LOCATION ESTIMATION METHOD

(75) Inventors: Chao-Lin Chen, Hsinchu (TW); Kai-Ten Feng, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 0 days.

(21) Appl. No.: 12/728,375

(22) Filed: Mar. 22, 2010

(65) Prior Publication Data

US 2010/0173648 A1  Jul. 8, 2010

Related U.S. Application Data

(63) Continuation of application No. 11/619,635, filed on Jan. 4, 2007, now Pat. No. 7,715,852.

(51) Int. Cl.
*H04W 24/00* (2009.01)

(52) U.S. Cl. ............... 455/456.1; 455/456.2; 455/456.5; 455/456.6

(58) Field of Classification Search ............. 370/331, 370/332; 455/456.1–457
See application file for complete search history.

(56) References Cited

U.S. PATENT DOCUMENTS

| | | | |
|---|---|---|---|
| 6,134,448 A | 10/2000 | Shoji et al. | |
| 6,526,283 B1 * | 2/2003 | Jang ........................... | 455/456.5 |
| 6,727,850 B2 | 4/2004 | Park et al. | |
| 2002/0183071 A1 | 12/2002 | Shioda et al. | |
| 2004/0127228 A1 | 7/2004 | You et al. | |
| 2004/0198386 A1 | 10/2004 | Dupray | |
| 2004/0266457 A1 | 12/2004 | Dupray | |
| 2005/0054312 A1 | 3/2005 | Spirito et al. | |
| 2005/0239478 A1 | 10/2005 | Spirito | |
| 2005/0255854 A1 | 11/2005 | Sillasto et al. | |
| 2005/0255865 A1 | 11/2005 | Sillasto et al. | |
| 2005/0267677 A1 | 12/2005 | Poykko et al. | |
| 2006/0276201 A1 | 12/2006 | Dupray | |
| 2007/0287473 A1 | 12/2007 | Dupray | |
| 2008/0261622 A1 | 10/2008 | Lee et al. | |

OTHER PUBLICATIONS

"GPS Receiver Architectures and Measurements" Braasch, et al., Jan. 1999, pp. 48-64.
"Acquisition of GPS C/A Code Signals" James Bao-Yen Tsui, 2000, pp. 133-164.
"New Fast GPS Code-Acquisition Technique Using FF" Electronics Letters Jan. 17, 1991, pp. 158-160.
"GPS Receiver Search Techniques" Phillip W. Ward, 1996, pp. 604-611.
"Averaging Correlation for C/A Code Acquisition and Tracking in Frequency Domain" Starzyk et al., 2001, pp. 905-908.
"Improved Search Algorithm for Fast Acquisition in a DSP-based GPS Receiver" Daffara et al., 1998, pp. 310-314.
"Understanding the Indoor GPS Signal" Haddrell, et al., Sep. 2001, pp. 1487-1499.
"Process for Improving GPS Acquisition Assistance Data and Server-Side Location Determination for Cellular Networks" Harper et al., Dec. 2004.

(Continued)

*Primary Examiner* — Kent Chang
*Assistant Examiner* — Ronald Eisner
(74) *Attorney, Agent, or Firm* — Thomas|Kayden

(57) ABSTRACT

A location estimation method is provided. The method locates coordinates of a mobile station (MS) by referencing a plurality of base stations (BS). A geometric distribution of the BS is analyzed to provide a list of conditional equations. A virtual BS is allocated, having a virtual distance to the MS to provide a constraint equation. The MS location is derived from the conditional equations and the constraint equation.

11 Claims, 5 Drawing Sheets

OTHER PUBLICATIONS

"Analysis of a Software-based A-GPS Acquisition Performance Using Statistical Processes" Kubrak et al., Jan. 2005, pp. 1082-1092.

"Block Acquisition of Weak GPS Signals in a Software Receiver" Mark L. Psiaki, Sep. 2001, pp. 2838-2850.

"Diffierentially Coherent Combining for Double-Dwell Code Acquisition in DS-CDMA Systems" Shin et al., 2003, pp. 1046-1050.

"An Assisted GPS Acquisition Method Using L2 Civil Signal in Weak Signal Environment" Cho et al., Nov. 2004, pp. 25-31.

"Efficient Differentially Coherent Code/Doppler Acquisition of Weak GPS Signals" Elders-Boll, et al., 2004, pp. 731-735.

"A Software GPS Receiver for Weak Signals" Lin et al., 2001, pp. 2139-2142.

* cited by examiner

LOCATION ESTIMATION METHOD

CROSS REFERENCE TO RELATED APPLICATIONS

This application is a Continuation of pending U.S. patent application Ser. No. 11/619,635, filed on, Jan. 4, 2007, which claims the benefit of U.S. Provisional Application No. 60/757,140, filed Jan. 6, 2006, the entirety of which are incorporated by reference herein.

BACKGROUND OF THE INVENTION

1. Field of the Invention

The invention relates to wireless location systems, and more particularly, to enhanced precision in location estimation of a mobile station under different environments.

2. Description of the Related Art

Mobile location estimation is of considerable interest in wireless communications. A mobile station (MS) may locate itself by communicating with a plurality of geometrically distributed base stations (BS).

FIG. 1 shows a Time-of-Arrival (TOA) based location estimation with three base stations. For a $l^{th}$ BS, TOA $\tau_l$ is estimated as:

$$t_l = \frac{r_l}{c} = \frac{\zeta_l}{c} + n_l \quad l = 1, 2, \ldots, N \quad (1)$$

Where c is the speed of light, $r_l$ represents the measured relative distance between the mobile station (MS) and $l^{th}$ BS, composed of actual distance $\zeta_l$ and TOA measurement noise $n_l$. The actual distance $\zeta_l$ can be obtained according to the formula:

$$\zeta_l = \sqrt{(x-x_l)^2 + (y-y_l)^2} \quad (2)$$

Where the coordinates (x, y) represents the MS's location to be determined, and $(x_l, y_l)$ is the location of $l^{th}$ BS.

In FIG. 1, with the measured distances $r_l$ used as radiuses, three circles $BS_1$, $BS_2$ and $BS_3$ are correspondingly formed for each $l^{th}$ BS. Ideally, the measured distance $r_l$ meets the actual distance $\zeta_l$, thus three circles intersect at the single point (x,y) where the MS is located. Due to None-Line of Sight (NLOS) measurement errors, however, the measured distance $r_l$ is always larger than the actual distance $\zeta_l$, and a rough, or confined region, defined by cross points A, B and C is respectively formed instead, thus, the MS is theoretically situated somewhere in the defined region. In X. Wang, Z Wang and B. O'Dea "A TOA-based location algorithm reducing the errors due to non-line-of-sight (NLOS) propagation" Published in IEEE Trans., vol. 52, January 2003, a two step least square (LS) algorithm is utilized to converge the estimated MS location $(x_e, y_e)$ to the actual MS location (x,y). For gentle NLOS environments, the two-step LS algorithm is efficient and highly accurate. When the confined region ABC grows as the NLOS error increases, the accuracy of the two-step LS algorithm may significantly decrease, particularly for an MS located at the boundaries of arcs AB, BC and CA. Thus, an improved algorithm is desirable.

BRIEF SUMMARY OF THE INVENTION

Location estimation methods are provided. An exemplary embodiment of a location estimation method comprises determining the coordinates corresponding to the location of a mobile station (MS) by referencing a plurality of base stations (BS). A geometric BS distribution is analyzed to provide a list of conditional equations. A virtual BS is allocated, having a virtual distance from the MS to provide a constraint equation. The MS location is derived from the conditional equations and the constraint equation.

When analyzing the geometric distribution, coordinates of each BS are transmitted to the MS. Time-of Arrival (TOA) signals transmitted to or from each BS are estimated to correspondingly calculate measured distances. The noise level of each transmission is measured to calculate standard deviations of the measured distances. The conditional equations are therefore derived based on the measured distances and the standard deviations.

Particularly, an initial estimate of the MS location is derived from the standard deviations and coordinates of the BS. The virtual distance is calculated based on the initial estimate of the MS location, the coordinates of the BS and a plurality of virtual coefficients corresponding to a BS. A geometric dilution of Precision (GDOP) contour is rendered, statistically presenting measurement error distribution of the BS.

When allocating the virtual BS, peak values distributed in the GDOP contour are observed. The virtual BS is allocated to a position where at least one peak value is causally smoothed away. Specifically, the position of the virtual BS is determined by adjusting the virtual coefficients. The constraint equation is a function of the coordinates of the virtual BS and the virtual distance.

When estimating the MS location, the conditional equations and the constraint equation are substituted into a two-step linear square algorithm. For a first step of the two-step least square algorithm, a variable is provided, equivalent to the square sum of the MS location: $\beta = x^2 + y^2$, where (x,y) are the coordinates of the MS location, and $\beta$ is the variable. A first linear vector is derived from the variable and MS location coordinates. A maximum likelihood search is then performed using the first linear vector, the conditional equations and the constraint equations. A preliminary solution is therefore obtained, comprising a preliminary coordinate of the MS location.

For a second step of the two-step least square algorithm, a second linear vector is derived from the preliminary coordinate of the MS location. The maximum likelihood search is performed using the second vector, the conditional equations and the constraint equations, such that a final solution is obtained.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

According to N. Levanon, "Lowest GDOP in 2-D Scenarios" Published in Navig., vol. 147, June 2002, geometric BS distribution may affect MS estimation accuracy, thus a geometric dilution of precision (GDOP) is defined as a dimensionless expression to describe a ratio between location estimation error and the associated measurement error, such as NLOS or noise in TOA measurement. Typically, higher GDOP indicates worse conditions. The paper explained how to develop a GDOP contour for a given geometric distribution.

Figure 1:
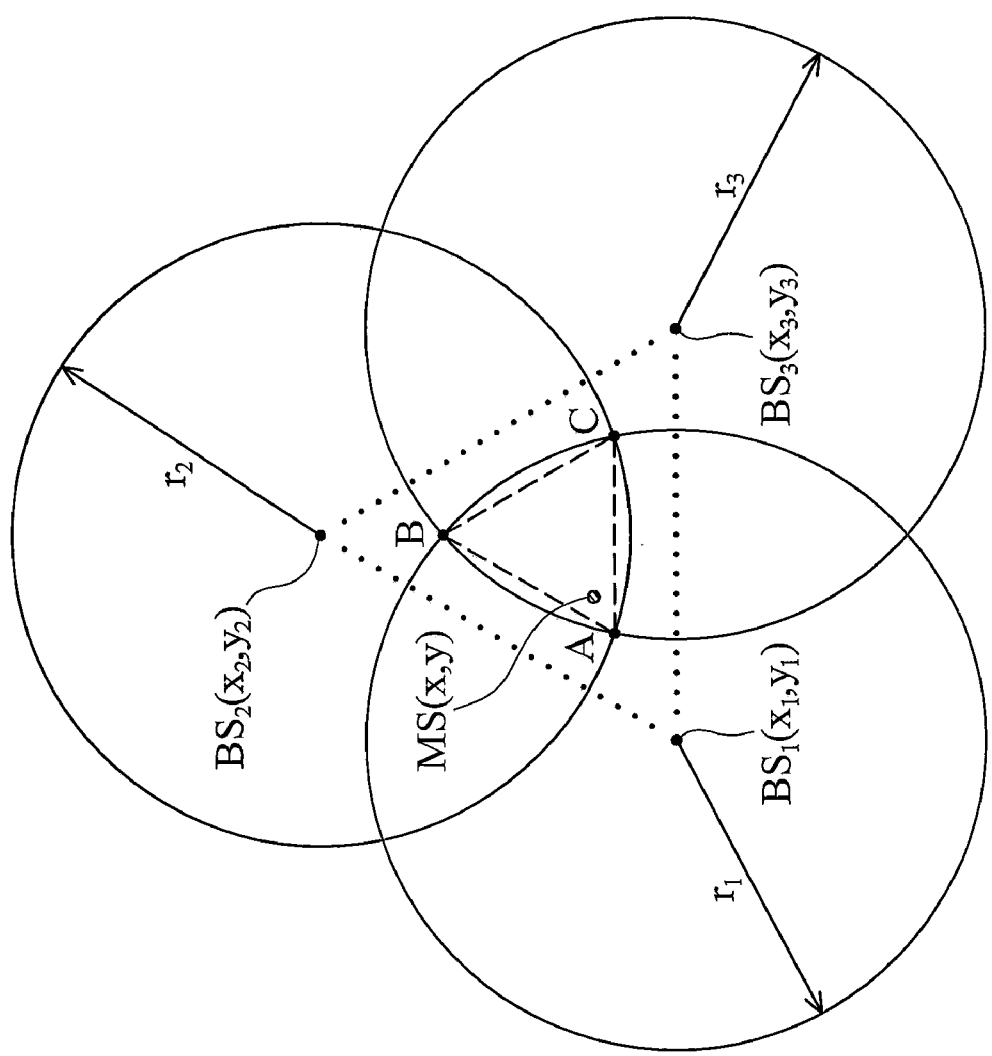
FIG. 1 shows a Time-of-Arrival (TOA) based location estimation with three base stations.

From the intuitional perspective of FIG. 1, an actual MS location (x,y) is expected to be found within the confined region ABC. By using the conventional two-step LS algorithm, however, the estimated MS location may be falsely deemed to be outside the confined region ABC, and its rationality can, thus, not be mathematically verified. In the embodiment of the invention, the geometric distribution is observed to calculate a GDOP contour, and one or more virtual BSs are accordingly provided, distributing at specifically selected positions. The virtual BSs are actually constraint equations applicable to the two-step LS algorithm to prevent false solutions, ensuring that the solution is within a reasonable range.

At least three BSs are required to perform the TOA based location estimation, thus, three BSs, BS1, BS2, and BS3, are considered in the embodiment. To confine the estimated MS location within a reasonable range, define:

$$\gamma = \sum_{i=a,b,c} \alpha_i \|X - X_i\|^2 \qquad (3)$$

where X denotes the actual MS location (x,y). Coordinates of the BSs $BS_1$, $BS_2$ and $BS_3$ are denoted as: $X_a=(x_a,y_a)$, $X_b=(x_b,y_b)$ and $X_c=(x_c,y_c)$. $\alpha_i$ for i=a, b and c are virtual coefficients. Calculation of the virtual coefficients $\alpha_i$ will be described later. Physically, $\gamma$ represents a virtual square distance between the MS and the three MSs, $MS_1$, $MS_2$ and $MS_3$.

As is known, the two-step LS algorithm requires an initial estimate. A presumed solution $X_e=(x_e,y_e)$ is chosen to be located within the confined region ABC under the intuitive assumption, and the expected virtual distance $\gamma_e$ is given as an initial estimate of the embodiment:

$$\gamma_e = \sum_{i=a,b,c} \alpha_i \|X_e - X_i\|^2 = \gamma + n_\gamma \qquad (4)$$

where $n_\gamma$ is a deviation between the $\gamma$ and $\gamma_e$, a target to be minimized after all. The initial value of $X_e=(x_e,y_e)$ is chosen according to signal variation rates of the $X_a$, $X_b$ and $X_c$ with weighting factors ($w_1$, $w_2$, $w_3$), expressed as:

$$x_e = w_1 x_a + w_2 x_b + w_3 x_c \qquad (5)$$

$$y_e = w_1 y_a + w_2 y_b + w_3 y_c \qquad (6)$$

where

-continued $$w_l = \frac{\sigma_l^2}{\sigma_1^2 + \sigma_2^2 + \sigma_3^2} \text{ for } l = 1, 2, 3 \qquad (7)$$

The parameters, $\sigma_1$, $\sigma_2$ and $\sigma_3$, are standard deviations obtained from the corresponding measured distances $r_1$, $r_2$ and $r_3$ in formula (1). Taking the circle $BS_1$ for example, the MS should be located around the circle boundary $r_1$ if NLOS error is negligible. Conversely, if the standard deviation $\sigma_1$ is relatively large, showing unstable interference caused by NLOS noise, the actual MS location (x,y) is considered to be closer to the center of circle. Consequently, the weighting factor $w_1$ is assigned a larger value, moving the initial value of $X_e=(x_e,y_e)$ closer toward the center of circle $BS_1$. Similarly, the other weighting factors $w_2$ and $w_3$ are accordingly assigned. The initial value of $X_e=(x_e,y_e)$ subsequently calculated from formulae (5), (6) and (7) is substituted into formula (4) to represent the expected virtual distance $\gamma_e$.

Figure 2:
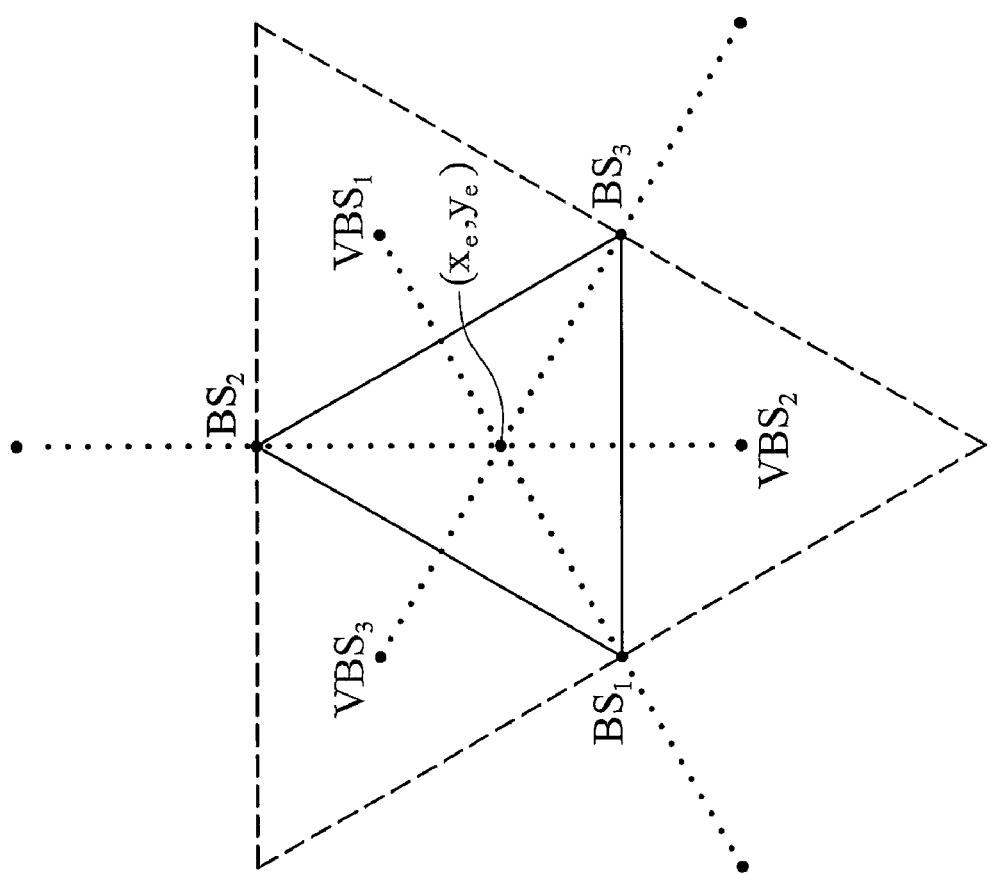
FIG. 2 shows an embodiment of virtual BS allocation.

FIG. 2 shows an embodiment of virtual BS allocation. In this embodiment, one or more virtual BSs may be allocated by virtual coefficients $\alpha_a$, $\alpha_b$ and $\alpha_c$ to satisfy the expected virtual distance $y_e$ in formula (4). A virtual BS may have the coordinates $X_v=(x_v,y_v)$ in which:

$$x_v = \alpha_a x_a + \alpha_b x_b + \alpha_c x_c \qquad (8)$$

$$y_v = \alpha_a y_a + \alpha_b y_b + \alpha_c y_c \qquad (9)$$

where the coordinates of BS $X_a=(x_a,y_a)$, $X_b=(x_b,y_b)$ and $X_c=(x_c,y_c)$ are known values upon TOA. The virtual coefficients $\alpha_a$, $\alpha_b$ and $\alpha_c$ may be determined according to observation of the GDOP contour. As an example, to facilitate the formulation of the two-step LS algorithm, the virtual coefficients can be associated with a relationship:

$$\sum_{i=a,b,c} \alpha_i = 1 \qquad (10)$$

The corresponding virtual BSs can be visualized as $VBS_1$, $VBS_2$ and $VBS_3$.

Figure 3A:
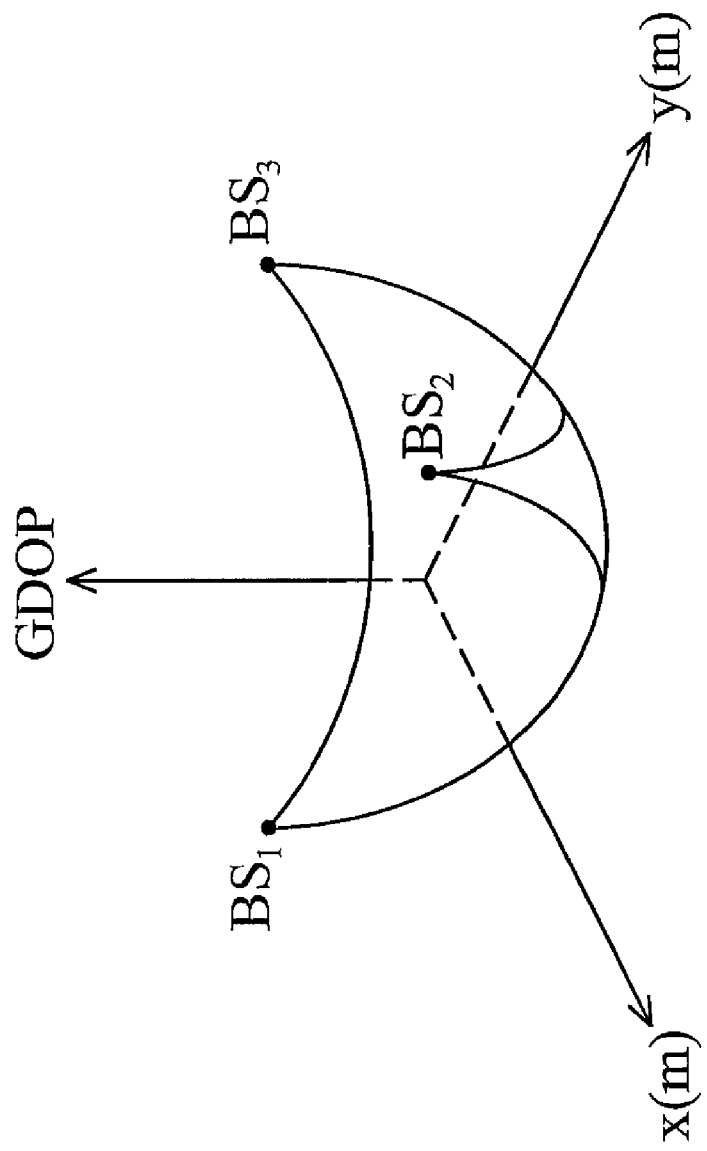
FIG. 3a shows a GDOP contour associated with the three BSs of FIG. 1.

FIG. 3a shows a GDOP contour associated with the three BSs of FIG. 1, $BS_1$ $BS_2$ and $BS_3$, in which GDOP effect is presented in varying heights plotted on an X-Y plane. Particularly, it is shown that GDOP effect near the apexes $BS_1$ $BS_2$ and $BS_3$ are significantly high, thus, precise calculation is relatively difficult.

Figure 3B:
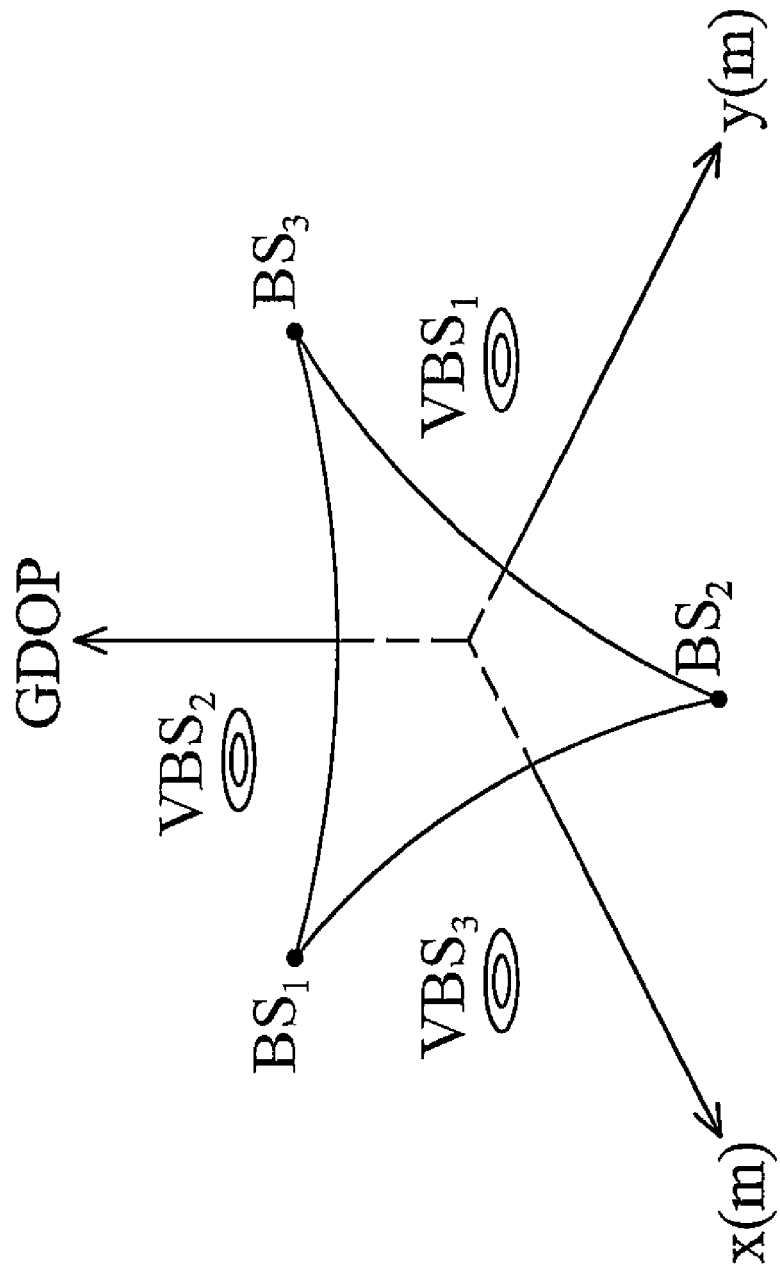
FIG. 3b shows an altered GDOP contour associated with the original BS and an additional virtual BS.

FIG. 3b shows an altered GDOP contour associated with the original BSs and additional virtual BSs. Specifically, the original geometric distribution is changed by the virtual BS $VBS_1$, $VBS_2$ and $VBS_3$ in FIG. 2. In this way, the extraordinary peaks occurring at the apexes $BS_1$ $BS_2$ and $BS_3$ are efficiently smoothed away, which is beneficial for further two-step LS calculation. With the presence of the virtual BSs, the geometric distribution can be changed to a virtually ideal version. Virtual BSs may be assigned by setting the virtual coefficients ($\alpha_a,\alpha_b,\alpha_c$) in any other combination constrained by formula (4) to help reducing the GDOP effects.

The two-step LS algorithm comprises two steps. The first step ignores non-linear dependencies of the variables to approximate a preliminary solution. The second step considers the non-linear dependencies and converges the preliminary solution to derive a final solution. Specifically, the actual MS location (x,y) is solved based on the joint equations:

$$r_1^2 \geq \zeta_1^2 = (x_1-x)^2 + (y_1-y)^2 = x_1^2 + y_1^2 - 2x_1 x - 2y_1 y + x^2 + y^2 \quad (11)$$

$$r_2^2 \geq \zeta_2^2 = (x_2-x)^2 + (y_2-y)^2 = x_2^2 + y_2^2 - 2x_2 x - 2y_2 y + x^2 + y^2 \quad (12)$$

$$r_3^2 \geq \zeta_3^2 = (x_3-x)^2 + (y_3-y)^2 = x_3^2 + y_3^2 - 2x_3 x - 2y_3 y + x^2 + y^2 \quad (13)$$

$$\gamma_e = (x_v-x)^2 + (y_v-y)^2 = x_v^2 + y_v^2 - 2x_v x - 2y_v y + x^2 + y^2 \quad (14)$$

Where $r_1$, $r_2$, $r_3$ are measured distances respectively, and the expected virtual distance $\gamma_e$ is given in formula (4). A new variable $\beta$ is defined intended to ignore its non-linearity in the first step.

$$\beta = x^2 + y^2 \quad (15)$$

Furthermore, let:

$$k_i = x_i^2 + y_i^2 \text{ for } i=1, 2, 3, v \quad (16)$$

then equations (11), (12) and (13) can be rewritten as:

$$-2x_i x - 2y_i y + \beta \leq r_i^2 - k_i \text{ for } i=1, 2, 3 \quad (17)$$

Likewise, equation (14) becomes $$-2x_v x - 2y_v y + \beta = \gamma_e - k_v \quad (18)$$

where $k_v$ can be extended from formulae (8) and (9):

$$k_v = \alpha_a(x_a^2 + y_a^2) + \alpha_b(x_b^2 + y_b^2) + \alpha_c(x_c^2 + y_c^2) \quad (19)$$

The joint equations (17) and (18) can be rewritten in a matrix form:

$$HX = J + \psi \quad (20)$$

$$X = [x \; y \; \beta]^T \quad (21)$$

$$H = \begin{bmatrix} -2x_1 & -2y_1 & 1 \\ -2x_2 & -2y_2 & 1 \\ -2x_3 & -2y_3 & 1 \\ -2x_v & -2y_v & 1 \end{bmatrix} \quad (22)$$

$$J = \begin{bmatrix} r_1^2 - k_1 \\ r_2^2 - k_2 \\ r_3^2 - k_3 \\ \gamma_e - k_v \end{bmatrix} \quad (23)$$

Where $\psi$ in equation (20) is a noise matrix, and its expectation value can be calculated by a known equation:

$$\Psi = E[\psi \psi^T] = 4c^2 BQB \quad (24)$$

in which B is a diagonal matrix of the actual distances:

$$B = \text{diag}[\zeta_1 \; \zeta_2 \; \zeta_3 \; |\gamma|^{\frac{1}{2}}] \quad (25)$$

and Q is a diagonal matrix of standard deviation values corresponding to each actual distance:

$$Q = \text{diag}\left[\sigma_1^2 \; \sigma_2^2 \; \sigma_3^2 \; \frac{\sigma_{|\gamma_e|^{0.5}}^2}{c^2}\right] \quad (26)$$

For the first step of least square algorithm, the matrixes H, J and $\Psi$ in equations (22), (23) and (24) are substituted into a maximum likelihood function to generate a preliminary solution X':

$$X' = [x' y' \beta']^T = (H^T \Psi^{-1} H)^{-1} H^T \Psi^{-1} J \quad (27)$$

The variable $\beta'$ is converged in the first step without considering dependency on coordinates (x,y). The preliminary solution is further fed back with non-linearity dependency considered. Let:

$$\beta' = x^2 + y^2 \quad (28)$$

A total of coordinates (x,y) satisfying equation (28) are searched in the second step of the LS algorithm, thus a constrained linear square problem as follows is to be solved:

$$\min[(j - HX')^T \Psi^{-1} (j - HX')] \text{ for } HX' \leq J \quad (29)$$

In which, the expected value of noise term $\Psi$ is recalculated by a diagonal distance matrix B' based on the preliminary (x',y').

In Y. Chan and K. Ho, "A simple and efficient estimator for hyperbolic location," IEEE Trans, Signal Processing, Vol. 42, no. 8, pp. 1905-1915, 1994, an approach is introduced to solve the covariance of X':

$$\text{cov}(X') = (H^T \Psi^{-1} H)^{-1} \quad (30)$$

Let the errors between the preliminary solution and actual value as:

$$x = x' + e_1 \quad (31)$$

$$y = y' + e_2 \quad (32)$$

$$\beta = \beta' + e_3 \quad (33)$$

Another error vector can be defined as:

$$\psi' = J' - H'Z \quad (34)$$

where:

$$J' = \begin{bmatrix} x'^2 \\ x'^2 \\ \beta'^2 \end{bmatrix}, \quad (35)$$

$$H' = \begin{bmatrix} 1 & 0 \\ 0 & 1 \\ 1 & 1 \end{bmatrix}, \text{ and}$$

$$Z = \begin{bmatrix} x^2 \\ y^2 \end{bmatrix}$$

By substituting formulae (31), (32) and (33) to (34), the error vector can be expressed as follows when errors are negligible:

$$\psi' = \begin{bmatrix} 2xe_1 + e_1^2 \\ 2ye_2 + e_2^2 \\ e_3 \end{bmatrix} \approx \begin{bmatrix} 2xe_1 \\ 2ye_2 \\ e_3 \end{bmatrix} \quad (36)$$

and its expectation value can be calculated similar to formula (24):

$$\Psi' = E[\psi' \psi'^T] = 4B' \text{cov}(X')B' \quad (37)$$

where B' is a diagonal matrix defined as:

$$B' = \text{diag}[x, y, 0.5] \quad (38)$$

As an approximation, actual values x and y in matrix B' can be replaced by preliminary values x' and y' in formula (27), and a maximum likelihood estimation of the matrix $Z_f$ in (35) is given by:

$$Z_f = \begin{bmatrix} x^2 \\ y^2 \end{bmatrix} \qquad (39)$$

$$= (H'^T \Psi'^{-1} H')^{-1} H'^T \Psi'^{-1} J'$$

$$\approx (H'^T B'^{-1} (\text{cov}(X'))^{-1}) B'^{-1} H')^{-1} \cdot$$

$$(H'^T B'^{-1} (\text{cov}(X'))^{-1}) B'^{-1}) J'$$

Thus, the final position (x,y) is obtained by root of $Z_f$, where the sign of x and y coincide with the preliminary values (x', y').

Figure 4:
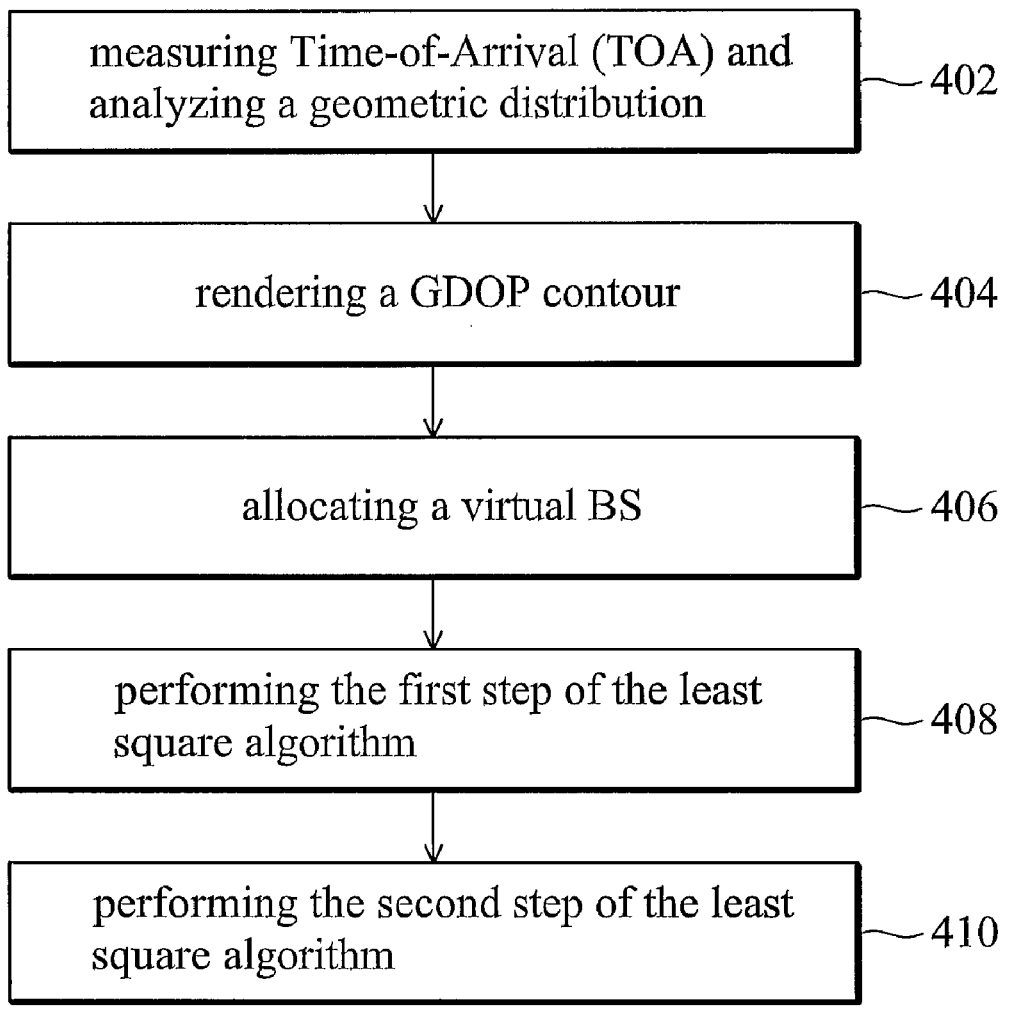
FIG. 4 is a flowchart of the location estimation method.

FIG. 4 is a flowchart of the location estimation method. The aforementioned derivations are descriptively summarized. In step 402, Time-of-Arrival (TOA) of each BS is estimated, and with known coordinates, a geometric distribution of the BSs is constructed. In step 404, a GDOP contour is rendered. In step 406, one or more virtual BSs are allocated at a chosen position. In step 408, the first step of the least square algorithm is performed to obtain a preliminary solution. In step 410, by substituting the preliminary solution, the second step of the least square algorithm is performed to obtain a final solution. The location estimation method may be applicable for mobile communication systems such as 3GPP.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A location estimation method for locating a mobile station (MS) by a plurality of base stations (BSs), comprising:
    analyzing a geometric distribution of the BSs to provide a list of conditional equations;
    rendering a geometric dilution of precision (GDOP) contour based on the analysis of the geometric distribution;
    allocating at least one virtual BS to a position according to the GDOPcontour, said virtual BS having a virtual distance to the MS to provide a constraint equation; and
    estimating the MS location based on the conditional equations and the constraint equations.

2. The location estimation method as claimed in claim 1, wherein analysis of the geometric distribution comprises:
    transmitting coordinates of each BS to the MS;
    estimating time-of arrival (TOA) of signals transmitted to or from the BSs to obtain measured distances correspondingly;
    measuring noise level of each transmission to calculate standard deviations of the measured distances; and
    generating the conditional equations based on the measured distances and the standard deviations.

3. The location estimation method as claimed in claim 2, further comprising calculating an initial estimate of the MS location based on the standard deviations and coordinates of the BSs.

4. The location estimation method as claimed in claim 3, further comprising determining the virtual distances based on the initial estimate of the MS location, the coordinates of the BSs and a plurality of virtual coefficients each corresponding to a BS.

5. The location estimation method as claimed in claim 4, further comprising rendering the GDOP contour based on the analysis of the geometric distribution, statistically presenting measurement error distribution of the BSs.

6. The location estimation method as claimed in claim 5, wherein allocation of the virtual BS comprises:
    observing peak values distributed in the GDOP contour; and
    allocating the virtual BSs to the positions where at least one peak value is causally smoothed away.

7. The location estimation method as claimed in claim 6, wherein the positions of the virtual BSs are determined by adjusting the virtual coefficients.

8. The location estimation method as claimed in claim 6, wherein the constraint equations is formed by the coordinates of the virtual BS and the virtual distances.

9. The location estimation method as claimed in claim 6, wherein estimation of the MS location comprises substituting the conditional equations and the constraint equations into a two-step least square algorithm.

10. The location estimation method as claimed in claim 9, wherein estimation of the MS location further comprises:
    for a first step of the two-step least square algorithm, providing a variable equivalent to the square sum of the MS location: $\beta = x^2 + y^2$, where (x,y) are the coordinates of the MS location, and $\beta$ is the variable;
    generating a first linear vector from the variable and the coordinates of MS location;
    performing a maximum likelihood search using the first linear vector, the conditional equation and the constraint equations; and
    obtaining a preliminary solution comprising a preliminary coordinate of the MS location.

11. The location estimation method as claimed in claim 10, wherein estimation of the MS location comprises:
    for a second step of the two-step least square algorithm, providing a second linear vector from the preliminary coordinate of the MS location;
    performing the maximum likelihood search using the second vector, such that a final solution is obtained.

* * * * *